US010570933B2

United States Patent
Nemeth et al.

(10) Patent No.: US 10,570,933 B2
(45) Date of Patent: Feb. 25, 2020

(54) PRESSURE-MEDIUM UNIT, HAVING A HOUSING PRODUCED BY INJECTION MOLDING AND COMPOSED OF PLASTIC, AND METHOD FOR PRODUCING SAID PRESSURE-MEDIUM UNIT

(71) Applicant: KNORR-BREMSE Systeme fuer Nutzfahrzeuge GmbH, Munich (DE)

(72) Inventors: Huba Nemeth, Budapest (HU); Gabor Szucs, Kecskemet (HU); Vincent Boehler, Saint Desir (FR); Stephane Hericher, Basseneville (FR); Csaba Mlinarcsek, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 52 days.

(21) Appl. No.: 15/911,978

(22) Filed: Mar. 5, 2018

(65) Prior Publication Data

US 2018/0195534 A1   Jul. 12, 2018

Related U.S. Application Data

(63) Continuation of application No. PCT/EP2016/070611, filed on Sep. 1, 2016.

(30) Foreign Application Priority Data

Sep. 4, 2015   (DE) .................. 10 2015 114 799

(51) Int. Cl.
*F15B 15/10* (2006.01)
*B60T 17/08* (2006.01)
*B29C 45/14* (2006.01)

(52) U.S. Cl.
CPC ............ *F15B 15/10* (2013.01); *B60T 17/088* (2013.01); *B29C 45/14* (2013.01)

(58) Field of Classification Search
CPC ......... B60T 17/08; B60T 17/088; F15B 15/10
(Continued)

(56) References Cited

U.S. PATENT DOCUMENTS 4,729,290 A * 3/1988 Ewald .................. B60T 17/086
                                                                    92/64
5,538,680 A    7/1996 Enders
(Continued)

FOREIGN PATENT DOCUMENTS

DE            30 26 596 A1    2/1982
DE    10 2012 210 485 A1     12/2013
(Continued)

OTHER PUBLICATIONS

International Search Report (PCT/ISA/210) issued in PCT Application No. PCT/EP2016/070611 dated Nov. 21, 2016 with English translation (seven pages).
(Continued)

Primary Examiner — Michael Leslie
(74) Attorney, Agent, or Firm — Crowell & Moring LLP

(57) ABSTRACT

A pressure-medium unit includes a housing, which is produced by injection molding and composed of plastic, in the housing wall of which housing at least one connection bush having a passage opening is fastened, through which pressure medium is fed into and/or led out of the interior of the housing. In the injection molding process of the housing, the connection bush, with the exception of the passage opening, is at least partially injection-molded into the housing wall.

18 Claims, 3 Drawing Sheets

(58) Field of Classification Search
USPC .................................................... 92/64
See application file for complete search history.

(56) References Cited

U.S. PATENT DOCUMENTS

| | | | |
|---|---|---|---|
| 5,980,618 A * | 11/1999 | Holzmann | B01D 46/2411 55/310 |
| 6,190,481 B1 | 2/2001 | Iida et al. | |
| 2001/0029994 A1 | 10/2001 | Brown et al. | |
| 2002/0023347 A1 | 2/2002 | Hannewald et al. | |
| 2004/0173618 A1 | 9/2004 | Suzuki et al. | |
| 2007/0107779 A1 | 5/2007 | Brook et al. | |
| 2009/0295026 A1 | 12/2009 | Thisselin | |
| 2010/0068554 A1 * | 3/2010 | Mueller | B29C 70/683 428/626 |

FOREIGN PATENT DOCUMENTS

| | | |
|---|---|---|
| EP | 0 810 081 A1 | 12/1997 |
| EP | 1 154 138 A2 | 11/2001 |
| EP | 1 371 856 A2 | 12/2003 |

OTHER PUBLICATIONS

German-language Written Opinion (PCT/ISA/237) ) issued in PCT Application No. PCT/EP2016/070611 dated Nov. 21, 2016 (five pages).

German-language Office Action issued in counterpart German Application No. 10 2015 114 799.8 dated Mar. 16, 2016 (five pages).

International Preliminary Report on Patentability (PCT/IB//373) issued in PCT Application No. PCT/EP2016/070611 dated Mar. 6, 2018, including English translation of document C2 (German-language Written Opinion (PCT/ISA/237) previously filed on Mar. 5, 2018) (seven (7) pages).

* cited by examiner

PRESSURE-MEDIUM UNIT, HAVING A HOUSING PRODUCED BY INJECTION MOLDING AND COMPOSED OF PLASTIC, AND METHOD FOR PRODUCING SAID PRESSURE-MEDIUM UNIT

CROSS REFERENCE TO RELATED APPLICATIONS

This application is a continuation of PCT International Application No. PCT/EP2016/070611, filed Sep. 1, 2016, which claims priority under 35 U.S.C. § 119 from German Patent Application No. 10 2015 114 799.8, filed Sep. 4, 2015, the entire disclosures of which are herein expressly incorporated by reference.

BACKGROUND AND SUMMARY OF THE INVENTION

The invention relates to a pressure medium unit, having a housing which is made from plastic, is manufactured by way of injection molding, and in the housing wall of which at least one connector socket with a through opening is fastened, through which through opening a feed and/or discharge of pressure medium into or out of the interior of the housing takes place, and by a method for producing the same.

The field of use of the invention extends, in particular, to pressure medium units which are operated by way of compressed air as pressure medium, such as multi-way valves, brake cylinders and the like. Units of this type usually have connector sockets for connecting pressure medium lines or pressure medium pipes made from plastic. In order to mount the connector socket, the housing of the pressure medium unit is provided with a fitting blind bore, the diameter of which is adapted to the external diameter of the connector socket.

A pressure medium assembly of the generic type is known, for example, from DE 30 26 596 A1. In DE 30 26 596 A1, the connector socket is pressed in a through opening of a cover, which is injection molded from plastic, of a diaphragm cylinder which is configured as a pneumatic brake cylinder.

Housings of pressure medium units, into which connector sockets of this type are pressed, are often injection molded from high strength, for example glass fiber reinforced, plastics for reasons of strength. When a connector socket is pressed into a corresponding blind bore of an injection molded housing of this type, the problem occurs that pressing stresses are introduced into the housing, which pressing stresses can lead to crack formations or to the fracture of the housing in the case of the predominantly low wall thicknesses of the housings. This is because high strength plastics of this type have only a low elastic capability.

EP 1 371 856 A2 discloses a pressure medium unit, on the housing of which a connector socket is introduced into a corresponding blind bore. Here, the fastening takes place not by way of being pressed-in, but rather via at least one recess which is provided in the wall region of the blind bore and interacts in the manner of a positively locking snap action connection with at least one hook-like molded projection on the connector socket which is adjusted to the blind bore in a pressure-tight manner. It is a disadvantage here, however, that the fastening of the connector socket takes place in this solution merely via two apertures in the housing which lie opposite one another as positively locking connecting points.

In contrast, the invention is based on the object of fastening a connector socket in the housing of a pressure medium unit in such a way that, firstly, a high retaining force of the connector socket in the housing wall is ensured and, secondly, critical stresses in the housing of the pressure medium unit are avoided.

According to the invention, said object is achieved by way of a pressure medium unit, and a method for assembling it, in accordance with embodiments of the invention.

In the pressure medium unit according to the invention and/or in the method for producing it, the connector socket, with the exception of the through opening, is injection molded at least partially into the housing wall during the injection molding of the housing. In other words, the housing is injection molded from plastic and, at the same time, the connector socket is injection molded at least partially into the housing wall in a single work step as early as during the production of the housing and within the context of the injection molding operation, at least the through opening of the connector socket not being covered by or being exposed by the injection molding material, in order to ensure an unobstructed and intended feed and discharge of pressure medium through the through opening.

The production method, from which the invention proceeds, comprises at least the step of injection molding the housing from plastic in an injection molding die. According to the invention, the at least one connector socket is then positioned in the injection molding die at the point which is provided for it and, with the exception of the through opening, is injection molded at least partially into the housing wall during the subsequent injection molding of the housing.

At least partial injection molding is understood to mean, in particular, injection molding, in the case of which at least part of the axial extent of the connector socket is injection molded into the housing wall as viewed in the direction of its center axis. Here, for example, part of the connector socket can still protrude, in particular, out of the outer face of the housing wall. As an alternative, the connector socket can be injection molded along its entire axial extent into the housing wall. It is merely decisive that no plastic is injection molded into the through opening, in order that the latter can still function as intended. Therefore, an outer circumferential face of the connector socket, with the exception of the through opening, is injection molded partially or completely in the housing wall.

As a result of the abovementioned measures, an integrally joined connection occurs between the radially outer circumferential face of the connector socket and the housing wall. This integrally joined connection ensures a high retaining force of the connector socket in the housing wall, without stresses which damage the housing wall, for instance, being produced as a result.

The connector socket is particularly preferably configured for releasably fastening a connector stub of a hose or pipe line, which connector stub conducts the pressure medium. To this end, the connector socket can be configured, in particular, in the manner of a push-in fitting for releasably fastening the connector stub which conducts the pressure medium. Threaded, plug-in or latching connections are contemplated here.

In order to seal the releasable connector stub/connector socket connection, at least one seal element can be arranged between a radially outwardly protruding collar of the connector stub and an outer face of the housing wall or an end face of the connector socket. Here, the seal element which is formed, for example, by way of an elastic sealing ring is held between the collar and the outer face of the housing wall or the end face with axial prestress, which has a favorable effect on the sealing action.

According to one particularly preferable embodiment, the connector socket has a sleeve part and a collar part which protrudes radially outwardly away from the sleeve part. At least the collar part preferably is molded completely into the housing wall by way of the injection molding operation. The collar part then ensures, in particular, satisfactory anchoring of the connector socket in the housing wall, even preferably with regard to loads perpendicularly with respect to the plane of the collar part as occur, for example, during the axial insertion or screwing of a connector stub into the connector socket.

According to one further embodiment, for the purpose of an anti-rotation safeguard of the connector socket with respect to the housing wall, the collar part can have a radially outer circumferential face which differs from a rotationally symmetrical face. This can be realized, for example, by virtue of the fact that the collar part has a radially outer circumferential face which is polygonal as viewed in cross section, for example a hexagonal cross section. As an alternative or in addition, the anti-rotation safeguard might also be realized by virtue of the fact that the collar part has at least one transversely extending through opening which is penetrated by the material of the housing wall.

An anti-rotation safeguard is advantageous, in particular, when the connector socket has an internal thread in its through opening, into which internal thread an external thread of a connector stub is then screwed, the connector socket being subjected to torsional loading.

As described above, the connector socket can be injection molded along its entire axial extent into the housing wall. The sleeve part then extends substantially from an inner face as far as an outer face of the housing wall.

According to a further embodiment or in addition to the above-described embodiment, for the purpose of an anti-rotation safeguard of the connector socket with respect to the housing wall, a radially outer circumferential face of the connector socket can have a shape which differs from a rotationally symmetrical face as viewed in cross section. There is then no collar part, and the sleeve part or the radially outer circumferential face has, for example, a polygonal cross section.

In order to ensure high wear resistance, high strength and stiffness in the context of high functional reliability with regard to repeated connecting and release operations of the connector stub in relation to the connector socket, the connector socket preferably consists of at least one metal or of a metal alloy.

The pressure medium unit is particularly preferably formed as a pneumatic brake cylinder, and the through opening of the connector socket then serves to fill and/or vent a brake chamber in the interior of the brake cylinder.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
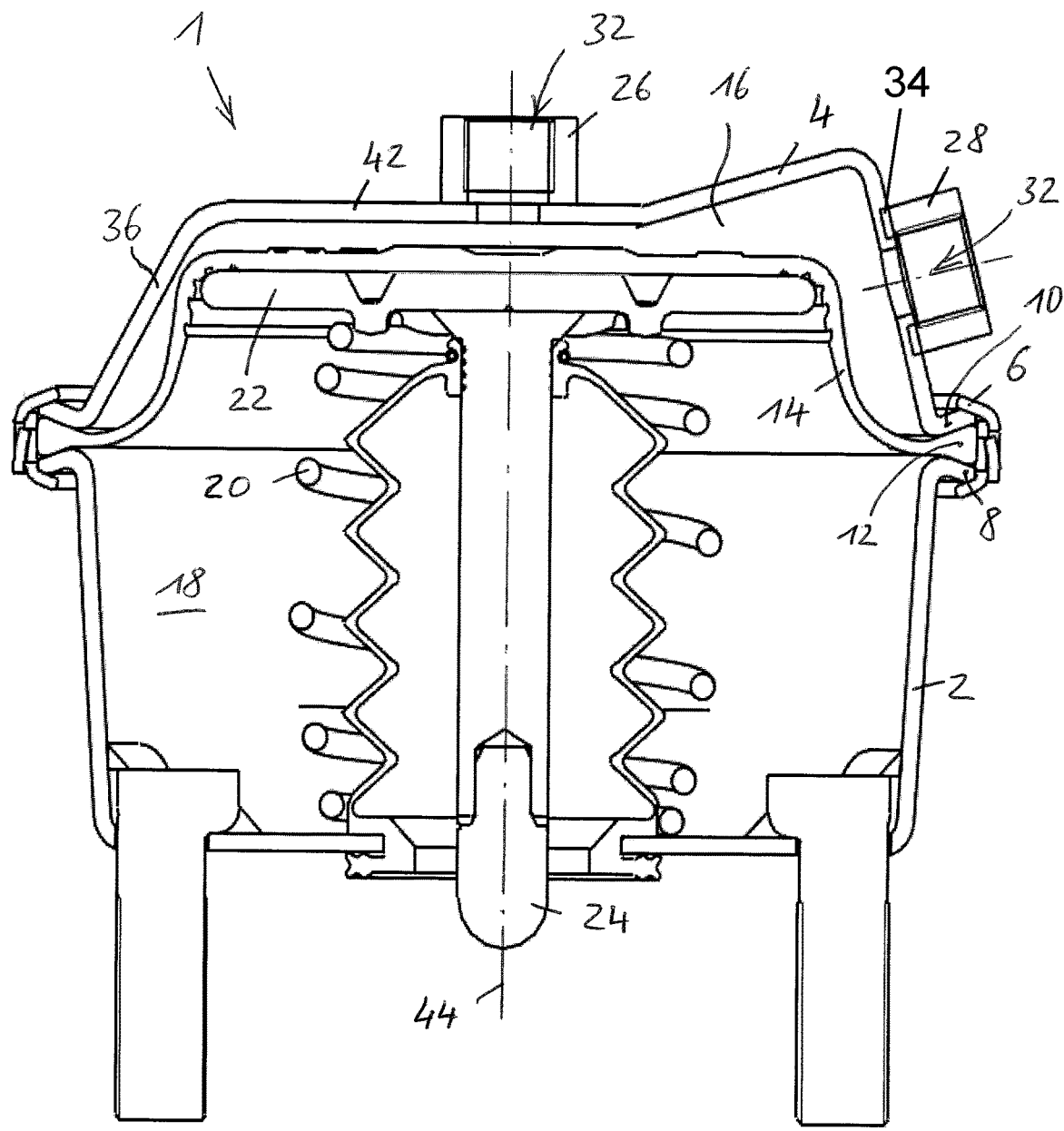
FIG. 1 shows a schematic circuit diagram of a pneumatic service brake cylinder according to the prior art, which pneumatic service brake cylinder has a connector socket for filling and venting a brake chamber.

FIG. 1 shows a pneumatic service brake cylinder 1 in cross section as one preferred embodiment of a pressure medium unit. To this extent, the service brake cylinder 1 is part of a pneumatic or electropneumatic service brake device of a vehicle, in particular of a heavy commercial vehicle.

The service brake cylinder 1 has two housing parts 2, 4 made from deep-drawn steel plate which are braced to one another, for example, with the aid of a clamping ring 6 which engages over radially outwardly pointing edges 8, 10 of the housing parts. The clamping ring 6 is crimped, for example, over the edges 8, 10 of the housing parts 2, 4, by being deformed plastically as an initially cylindrical ring by way of the axial pressure which results from a relative movement of crimping tools, for example in the form of a punch and a die.

Furthermore, an edge 12 of a diaphragm 14 is clamped in between the edges 8, 10 of the housing parts 2, 4 by way of the clamping ring 6, which diaphragm 14 sealingly separates a brake chamber 16, which can be filled and vented, from a spring chamber 18, in which a spring collar 22 is received which is pushed against the diaphragm 14 by way of the action of a compression spring 20 and to which a service brake piston rod 24 is fastened. The diaphragm 14 then seals the brake chamber 16 which can be filled and vented with respect to the spring chamber 18.

The service brake piston rod 24 protrudes through a through opening of the first housing part 2 (at the bottom in FIG. 1), in order to actuate a brake mechanism of the service brake of the vehicle, for example the brake mechanism of a disc brake.

The second housing part 4 (at the top in FIG. 1) delimits the brake chamber 16 together with the diaphragm 14, which brake chamber 16 can be filled and vented by means of (here, for example, two) connector sockets 26, 28. The connector sockets 26, 28 serve to releasably receive complementarily shaped connector stubs 30 (shown in FIG. 4 but not in FIGS. 1-3), to which compressed air lines are connected, through which compressed air can be fed into the brake chamber 16 and can also be discharged from the latter.

The connector sockets, a first connector socket 26 and a second connector socket 28, are in each case of sleeve-shaped configuration and in each case have a central axial through opening 32, through which the compressed air can flow. In the prior art, there are two blind bores 34 at the points at which the connector sockets 26, 28 are fastened to the second housing part 4 in the region of the brake chamber 16. The connector sockets 26, 28 are welded on the outside to the outer edges of the blind bores 3.

If the brake chamber 16 is therefore filled, for example, via a compressed air line which is connected to the first connector socket 26, a pressure force acts on the diaphragm 14. The pressure force is transmitted in the brake application direction by way of the spring collar 22 to the service brake piston rod 24 and to the brake mechanism. The service brake piston rod 24 then moves counter to the action of the compression spring 20 out of the first housing part 2 (at the bottom in FIG. 1) and applies the service brake.

If, in contrast, the brake chamber 16 is vented via a compressed air line which is connected, for example, to the second connector socket 28, the compression spring 20 moves the spring collar 22 in the direction of the brake chamber 16. The service brake piston rod 24 then moves out of the first housing part 2 (at the bottom in FIG. 1) in order to release the service brake.

In the case of the service brake cylinder 1 of the prior art, the housing parts 2, 4 therefore consist of deep-drawn steel sheet, and the connector sockets 26, 28 are fastened on the outside to the edges of the blind bores 34 of the second housing part 4 by way of welding.

In contrast to the service brake cylinder 1 of the prior art which is shown in FIG. 1, in the case of a service brake cylinder 1 as one preferred embodiment of a pressure medium unit according to the invention, at least the second housing part 4, to which the connector sockets 26, 28 are fastened, is injection molded from plastic or forms an injection molded product made from plastic.

Figure 2:
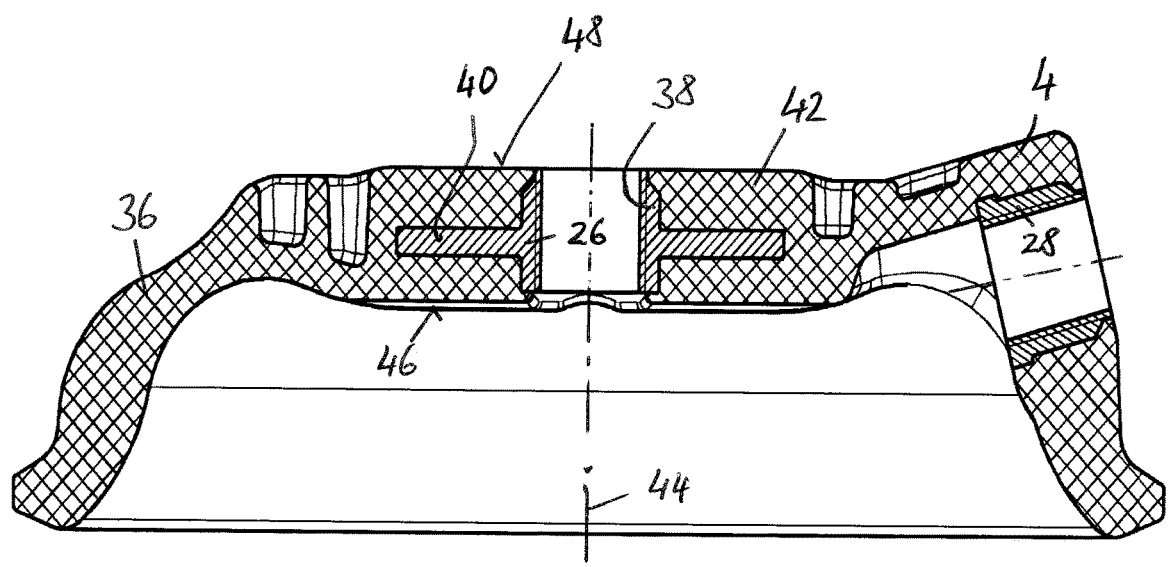
FIG. 2 shows a cross-sectional illustration of details of a housing wall of a pressure medium unit according to one preferred embodiment of the invention having a connector socket which is injection molded into the housing wall by way of an injection molding operation.

FIG. 2 shows details of a housing wall 36 of the second housing part 4, on or to which the (here, for example, likewise two) connector sockets 26, 28 are arranged or fastened. Like the second housing part 4, the first housing part 2 can also be injection molded from plastic. The plastic can be a fiber reinforced polycarbonate.

In contrast to the prior art, the connector sockets 26, 28 have been injection molded into the housing wall 36 in a single work step at the same time as the shaping of the second housing part 4. The result is that they are connected to the housing wall 36 at least in an integrally joined manner.

Apart from the production of the housing parts 2, 4 as injection molded products and the injection molding of the connector sockets 26, 28 into the housing wall 34 of the second housing part 4, the construction and the method of operation of the service brake cylinder 1 as one preferred embodiment of a pressure medium unit according to the invention is identical to the service brake cylinder 1 of the prior art which is shown in FIG. 1. The description there of the service brake cylinder 1 therefore also applies to the service brake cylinder 1 according to the invention, with the exceptions which have just been mentioned.

In the case of the embodiment of FIG. 2, for example, the first connector socket 26 has a sleeve part 38 and a collar part 40 which protrudes radially outwardly away from the sleeve part 38 and is, for example, annular plate-shaped. At least the collar part 40 preferably is molded completely into the housing wall 36 by way of the injection molding operation. The collar part 40 is arranged, for example, substantially centrally on the sleeve part 38 in relation to the axial extent of the sleeve part 38.

On account of the radial extent because of the collar part 40, the first connector socket 26 is preferably injection molded centrally into a bottom 42 of the second housing part 4, approximately coaxially with respect to a center axis 44 of the service brake cylinder 1. The second connector socket 28 is in the meantime injection molded into a lateral projection of the second housing part 4 during the forming thereof, and is of sleeve-shaped configuration, for example, without having a collar part 40, however.

It is clear that, instead of two connector sockets 26, 28, only a single connector socket can also be provided on the second housing part 4, which single connector socket is additionally arranged at any desired point of the second housing part 4, but always has to ensure a compressed air connection into the brake chamber 16.

The sleeve part 38 of the first connector socket 26 preferably extends from an inner face 46 (facing the brake chamber 16) of the housing wall 36 of the second housing part 4 as far as an outer face 48 of said housing wall 36, which outer face 48 points toward the atmosphere. As an alternative, the sleeve part 38 might also be longer or shorter. The second connector socket 28 likewise preferably extends from the inner face 46 (facing the brake chamber) of the housing wall 36 of the second housing part 4 as far as the outer face 48 of said housing wall 36. Those faces of the two connector sockets 26, 28 which differ from the respective through openings 32 are therefore preferably injection molded completely into the housing wall 36 of the second housing part 4 or are encapsulated or encased by the plastic which forms the housing wall 36.

In the case of the injection molding operation, the connector sockets 26, 28 which preferably consist of metal are first of all positioned in the injection molding die at those points of the housing wall 36 (which do not yet exist) which are provided for them. Subsequently, the housing wall 36 is produced by way of injection molding in the injection molding die, the connector sockets 26, 28 being injection molded into the housing wall with the exception of their through openings 32. In order to release the through openings 32, corresponding cores, for example, are provided in the injection molding die.

Figure 3A:
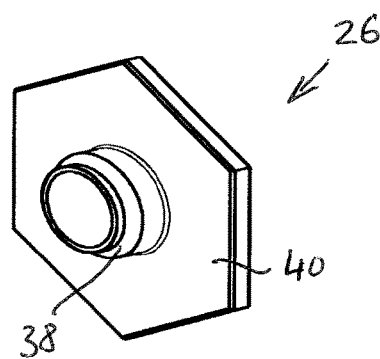
FIGS. 3A and 3B show a perspective and enlarged individual illustration of connector sockets.

FIG. 3A shows the first connector socket 26 which consists of the sleeve part 38 and the collar part 40, in an individual illustration in one preferred embodiment. There, the collar part 40 is, for example, polygonal and, in particular, hexagonal as viewed in cross section. The polygonal shape which is after all injection molded into the housing wall 36 then forms an anti-rotation safeguard of the first connector socket 26 with respect to the housing wall 36 because there are then differently oriented straight circumferential faces which can be supported in the housing wall 36.

Figure 3B:
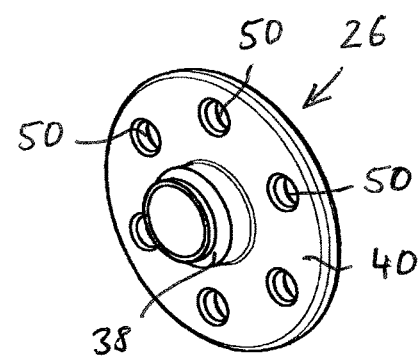

As an alternative or in addition, the anti-rotation safeguard might also be realized according to the embodiment of FIG. 3B of a first connector socket 26 by virtue of the fact that the collar part 40 has transversely extending through openings 50 which are then penetrated by the material of the housing wall 36 during the injection molding, with the configuration of a positively locking connection.

An anti-rotation safeguard of this type might also not be provided in a connector socket, however, as illustrated using the second connector socket 28 in FIG. 2, which second connector socket 28 is merely sleeve-shaped and is therefore cylindrical as viewed in cross section. The integrally joined connection which is brought about by way of the injection molding operation between the radially outer circumferential face of the second connector socket 28 and the housing wall 36 then has to be sufficient to absorb torsional loads.

Figure 4:
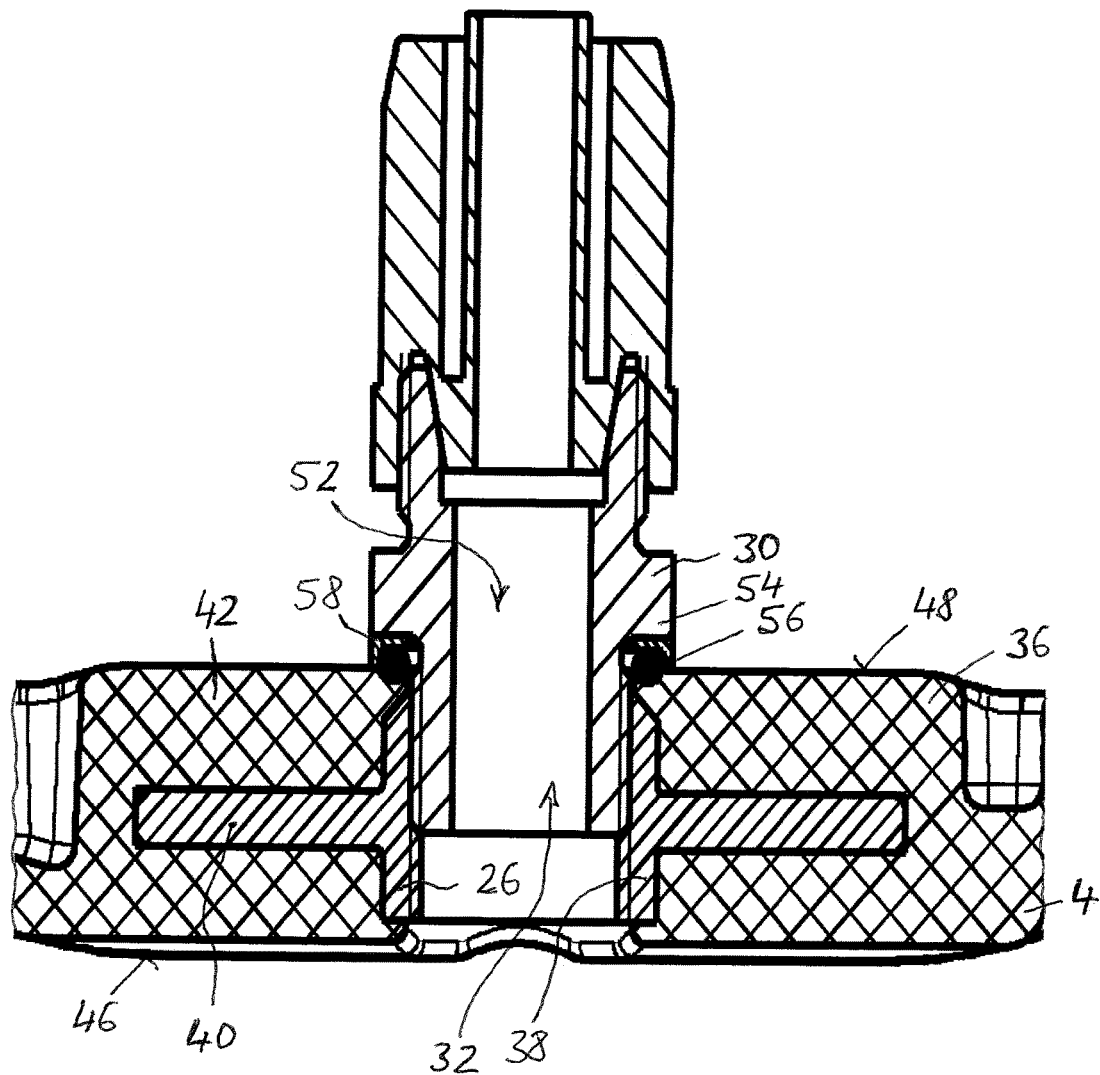
FIG. 4 shows a cross-sectional illustration of details of the housing wall of the pressure medium unit from FIG. 2, having a connector stub which is plugged into the connector socket.

FIG. 4 shows the situation in which a connector stub 30, which is provided, for example, with an external thread, is screwed into the first connector socket 26. The connector stub 30 then has a through opening 52 which is coaxial with respect to the through opening 32 of the first connector socket, in order to make a compressed air connection possible between the brake chamber 16 and a compressed air line (not shown here) which is connected to the connector stub.

Furthermore, the connector sockets 26, 28 can be configured for releasably fastening connector stubs 30 which conduct the pressure medium, in particular in the manner of push-in fittings. In general, threaded connections, plug-in connections or latching connections are contemplated between the connector sockets 26, 28 and the associated connector stubs 30.

As FIG. 4 shows, moreover, a seal element 56 can be arranged for sealing the releasable connector stub/connector socket connection between a radially outwardly protruding collar 54 of the connector stub 30 and the outer face 48 of the housing wall 36 or else an end face of the first connector socket 26. Here, the seal element 56 which is formed, for example, by way of an elastic sealing ring, is held under axial prestress between the collar 54 and the outer face 48 of the housing wall 36 or the end face, which has a favorable effect on the sealing action. In order to positionally fix the seal element 56 which is made, for example, from an annular elastomer, a retaining ring 58 with an L-shaped cross section can be provided.

The invention is not restricted, however, to an application in a service brake cylinder 1, but can be used in any type of pressure medium unit, in which pressure medium, in particular also hydraulic fluid, is conveyed via a connector socket, in particular via a connector socket/connector stub connection, into the interior of a housing or out of the interior of the housing. In particular, pneumatic spring brake cylinders are also contemplated for an application of this type, in which pneumatic spring brake cylinders a spring-loaded brake chamber is vented in order to apply a spring-loaded brake and is filled in order to release the brake.

LIST OF DESIGNATIONS

1 Service brake cylinder
2 First housing part
4 Second housing part
6 Clamping ring
8 Edge
10 Edge
12 Edge
14 Diaphragm
16 Brake chamber
18 Spring chamber
20 Compression spring
22 Spring collar
24 Service brake piston rod
26 First connector socket
28 Second connector socket
30 Connector stub
32 Through opening
34 Blind bores
36 Housing wall
38 Sleeve part
40 Collar part
42 Bottom
44 Center axis
46 Inner face
48 Outer face
50 Through opening
52 Through opening
54 Collar
56 Directional element
58 Retaining ring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure medium unit, comprising:
   an injection molded housing made from plastic;
   at least one connector socket with a through opening in a housing wall of the housing, through which through opening a feed and/or discharge of pressure medium into or out of an interior of the housing takes place, wherein
   the connector socket, with the exception of the through opening, is made of metal and is molded at least partially into the housing wall during the injection molding of the housing.

2. The pressure medium unit as claimed in claim 1, wherein
   the connector socket is configured for releasably fastening a connector stub of a hose or pipe line, which connector stub conducts the pressure medium.

3. The pressure medium unit as claimed in claim 2, wherein
   the connector socket is configured as a push-in fitting for releasably fastening the connector stub which conducts the pressure medium.

4. The pressure medium unit as claimed in claim 2, further comprising:
   at least one seal element arranged between a radially outwardly protruding collar of the connector stub and an outer face of the housing wall or an end face of the connector socket.

5. The pressure medium unit as claimed in claim 1, wherein
   the connector socket has a sleeve part and a collar part which protrudes radially outwardly away from the sleeve part, and
   at least the collar part is molded completely into the housing wall.

6. The pressure medium unit as claimed in claim 5, wherein
   for an anti-rotation safeguard of the connector socket with respect to the housing wall, the collar part has a radially outer circumferential face which differs from a rotationally symmetrical face.

7. The pressure medium unit as claimed in claim 6, wherein
   for the anti-rotation safeguard of the connector socket with respect to the housing wall, the collar part has a radially outer circumferential face which is polygonal as viewed in cross section.

8. The pressure medium unit as claimed in claim 5, wherein
   for an anti-rotation safeguard of the connector socket with respect to the housing wall, the collar part has at least one transversely extending through opening which is penetrated by molding material of the housing wall.

9. The pressure medium unit as claimed in claim 5, wherein
   the sleeve part extends substantially from an inner face as far as an outer face of the housing wall.

10. The pressure medium unit as claimed in claim 1, wherein
    for an anti-rotation safeguard of the connector socket with respect to the housing wall, a radially outer circumferential face of the connector socket has, as viewed in cross section, a shape which differs from a rotationally symmetrical face.

11. The pressure medium unit as claimed in claim 5, wherein
for an anti-rotation safeguard of the connector socket with respect to the housing wall, a radially outer circumferential face of the connector socket has, as viewed in cross section, a shape which differs from a rotationally symmetrical face.

12. The pressure medium unit as claimed in claim 1, wherein
an outer circumferential face of the connector socket is molded completely in the housing wall, with the exception of the through opening.

13. The pressure medium unit as claimed in claim 1, wherein
the pressure medium unit forms a pneumatic brake cylinder, and
the through opening of the connector socket serves to fill and/or vent a brake chamber in an interior of the brake cylinder.

14. A method for producing a pressure medium unit having a housing, wherein in a housing wall at least one connector socket with a through opening is arranged, through which through opening a feed and/or discharge of pressure medium into or out of an interior of the housing takes place, the method comprising the steps of:
injection molding the housing from plastic in an injection molding die, wherein at least one connector socket made of metal is positioned in the injection molding die at a defined point and, during the injection molding of the housing, is molded at least partially into the housing wall with the exception of the through opening.

15. A pressure medium unit, comprising:
an injection molded housing made from plastic;
at least one connector socket with a through opening in a housing wall of the housing, through which through opening a feed and/or discharge of pressure medium into or out of an interior of the housing takes place, wherein
the connector socket, with the exception of the through opening, is molded at least partially into the housing wall during the injection molding of the housing,
the connector socket has a sleeve part and a collar part which protrudes radially outwardly away from the sleeve part,
at least the collar part is molded completely into the housing wall, and
for an anti-rotation safeguard of the connector socket with respect to the housing wall, the collar part has one of both of at least one of a radially outer circumferential face which differs from a rotationally symmetrical face and at least one transversely extending through opening which is penetrated by molding material of the housing wall.

16. The pressure medium unit as claimed in claim 15, wherein
for the anti-rotation safeguard of the connector socket with respect to the housing wall, the collar part has a radially outer circumferential face which is polygonal as viewed in cross section.

17. A pressure medium unit, comprising:
an injection molded housing made from plastic;
at least one connector socket with a through opening in a housing wall of the housing, through which through opening a feed and/or discharge of pressure medium into or out of an interior of the housing takes place, wherein
the connector socket, with the exception of the through opening, is molded at least partially into the housing wall during the injection molding of the housing, and
for an anti-rotation safeguard of the connector socket with respect to the housing wall, a radially outer circumferential face of the connector socket has, as viewed in cross section, a shape which differs from a rotationally symmetrical face.

18. A pressure medium unit, comprising:
an injection molded housing made from plastic;
at least one connector socket with a through opening in a housing wall of the housing, through which through opening a feed and/or discharge of pressure medium into or out of an interior of the housing takes place, wherein
the connector socket, with the exception of the through opening, is molded at least partially into the housing wall during the injection molding of the housing,
the pressure medium unit forms a pneumatic brake cylinder, and
the through opening of the connector socket serves to fill and/or vent a brake chamber in an interior of the brake cylinder.

* * * * *